No. 776,447.   Patented November 29, 1904.

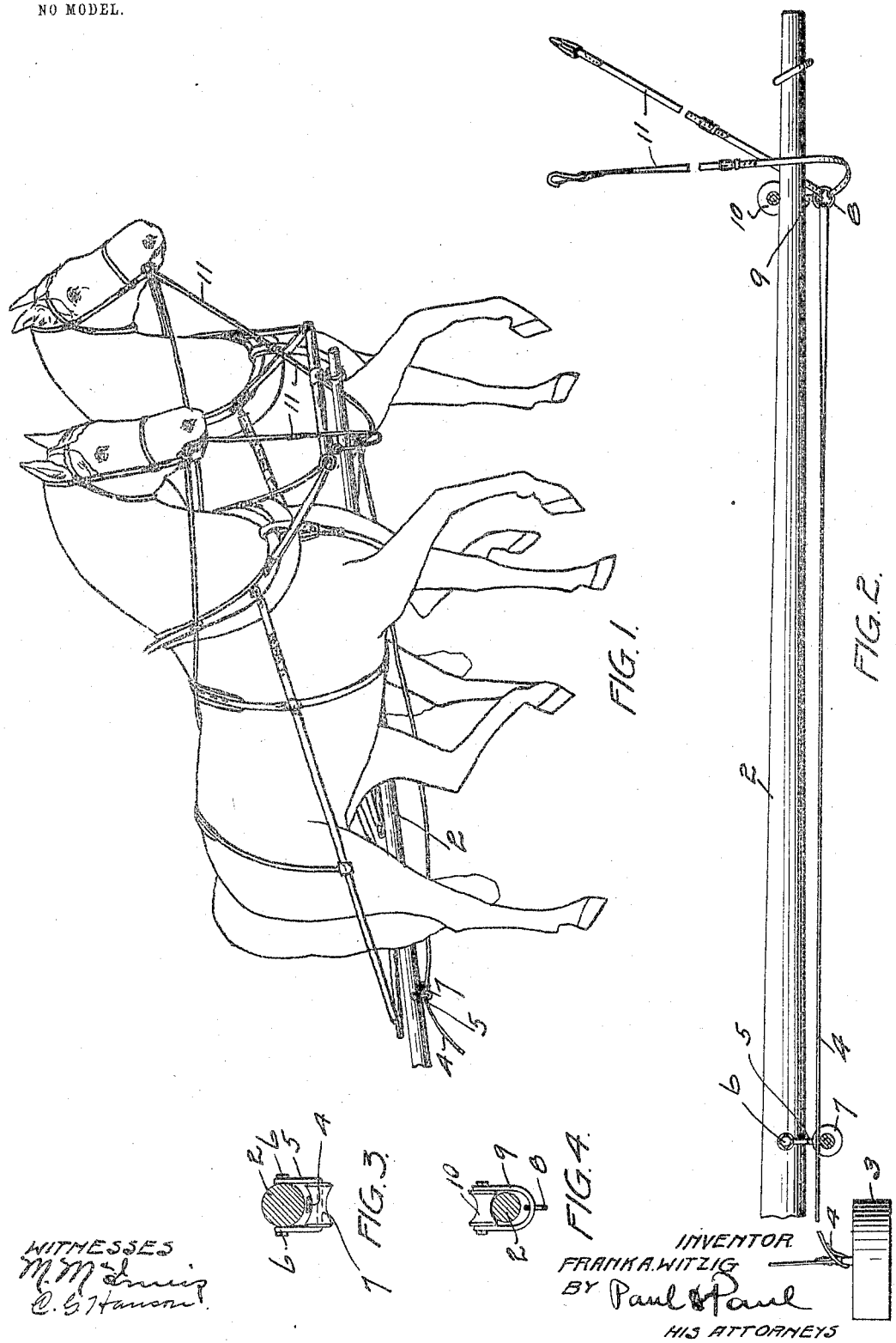

UNITED STATES PATENT OFFICE.

FRANK A. WITZIG, OF MINNEAPOLIS, MINNESOTA.

ATTACHMENT FOR HITCHING-STRAPS.

SPECIFICATION forming part of Letters Patent No. 776,447, dated November 29, 1904.

Application filed August 8, 1904. Serial No. 219,850. (No model.)

*To all whom it may concern:*

Be it known that I, FRANK A. WITZIG, of Minneapolis, Hennepin county, Minnesota, have invented certain new and useful Improvements in Attachments for Hitching-Straps, of which the following is a specification.

My invention relates to devices adapted for use with a hitching-weight strap of a single horse or a team; and the object of the invention is to provide a support for the outer end of the hitching-weight strap that will adjust itself automatically on the pole or shaft to the different positions of the weight.

The invention consists generally in various constructions and combinations, all as hereinafter described, and particularly pointed out in the claims.

In the accompanying drawings, forming part of this specification, Figure 1 is a perspective view showing my invention in use. Fig. 2 is a side view of the pole, showing my invention thereon and the straps leading therefrom to the bits. Figs. 3 and 4 are sectional views of the inner and outer ends of the pole.

In the drawings, 2 represents a pole, and 3 a hitching-weight provided with a strap 4. A loop 5 is fastened to the pole near its inner end by pins 6 and is provided with a hollow-faced antifriction-roller 7, over which the weight-strap is adapted to slide. The outer end of the strap is connected to a ring 8, arranged on a U-shaped loop 9, that incloses the under side of the pole and is provided above the pole with a hollow-faced roll or pulley 10, that is adapted to rest and slide upon the pole and automatically adjust itself to the different positions assumed by the hitching-weight. Straps 11 lead from the ring 8 to the bits. The roll 10 will slide freely on the surface of the pole, and there will be no binding or cramping of the weight-strap, but the power of the weight will be applied directly to the horse's mouth.

I have shown this device applied to the pole of a team; but it will be understood that it will also be applicable on the shaft of a single-horse vehicle.

I claim as my invention—

1. The combination, with a pole, of a hitching weight and strap connected therewith, a sliding support arranged on said pole and connected with the outer end of said weight-strap, and branch straps leading from said support to the bits.

2. The combination, with a pole, of a weight and loop pivotally secured on said pole near its inner end, a hollow-faced roller carried by said loop, a weight-strap passing over said roller and having a sliding connection with said pole near its outer end, substantially as described.

3. The combination, with a pole, of a weight, a weight-strap and loop connected to the outer end of strap, a hollow-faced roller carried by said loop and adapted to bear upon the top of the pole and adjust itself automatically thereon, and bit-straps leading from said loop to the bridles.

4. The combination, of a hitching-weight and its strap, with a loop attached to the outer end of said strap and provided with a hollow-faced antifriction-roller, and a bit-strap connected with said loop.

In witness whereof I have hereunto set my hand this 1st day of August, 1904.

FRANK A. WITZIG.

In presence of—
A. C. PAUL,
C. G. HANSON.